United States Patent [19]

Takano et al.

[11] Patent Number: 4,591,922
[45] Date of Patent: May 27, 1986

[54] RADIATION IMAGE REPRODUCING APPARATUS

[75] Inventors: Masao Takano; Eiichi Asai, both of Kanagawa, Japan

[73] Assignee: Fuji Photo Film Co., Ltd., Kanagawa, Japan

[21] Appl. No.: 521,285

[22] Filed: Aug. 8, 1983

[30] Foreign Application Priority Data

Aug. 9, 1982 [JP] Japan .................. 57-137347

[51] Int. Cl.$^4$ .......................................... H04M 1/40
[52] U.S. Cl. .................................. 358/280; 358/111; 358/296; 358/257
[58] Field of Search ............... 358/280, 111, 257, 293, 358/296; 355/8, 40; 354/105, 106

[56] References Cited

U.S. PATENT DOCUMENTS 4,370,409  1/1983  Bostroem ........................ 355/40
4,384,786  5/1983  Kuroda .......................... 355/40

Primary Examiner—James J. Groody
Assistant Examiner—Edward L. Coles
Attorney, Agent, or Firm—Sughrue, Mion, Zinn, Macpeak and Seas

[57] ABSTRACT

A radiation image reproducing apparatus reads a radiation image out of a first recording medium to record it on a second recording medium in a visible form after necessary image processings. Data indicative of a direction of an exposure, either from the front or from the rear of an object, is supplied so that in the case of a rear exposure the radiation image is reproduced on the second recording medium with its lateral position inverted. Data associated with the image processings is recorded in a visible form on the second recording medium together with the radiation image.

7 Claims, 3 Drawing Figures

RADIATION IMAGE REPRODUCING APPARATUS

BACKGROUND OF THE INVENTION

1. Field of the Invention

The present invention relates to a radiation image reproducing apparatus and, more particularly, to a radiation image reproducing apparatus of the type which senses a radiation image of an object stored in a stimulable phosphor sheet or like recording medium to record it on another recording medium.

2. Description of the Prior Art

A radiation photographing system has been proposed which uses a stimulable phosphor sheet as a recording medium, as disclosed in U.S. Pat. No. 3,859,527 for example. The recording medium is exposed to a radiation transmitted through an object to store a radiation image thereof. Afterwards, the recording medium is stimulated by stimulating rays so that the radiation image may be read photoelectrically to be recorded on another recording medium as a visible image of the object.

In an image reproducing apparatus applicable to the system described above, it is a usual practice to subject radiation image data read out to various image processings such as a gradation processing and a spatial frequency processing and, then, to record the processed data on a photo film or like recording medium as a hard copy, or to reproduce it as a visible image on a cathode-ray tube (CRT) or any other suitable display device.

When a stimulable phosphor sheet is exposed to an imagewise radiation of an object, information on the object and exposure is entered into the image reproducing apparatus to be stored in a file. Some of the information is read out of file in the event of the subsequent reproduction of the object's image to be recorded as visible information on a hard copy of the reproduced image. The visible object and exposure information may be utilized for diagnoses by a doctor, for example. Such information may be typified by identification (ID) data on a patient or like object and exposure conditions which include exposed object's part and exposing method.

To facilitate a diagnosis, a patient's specific part is often exposed to radiations in various angles or directions as may be the case with the thorax. Supposing a case wherein the thorax of a human body was photographed from the rear thereof, a doctor or like specialist will customarily make a diagnosis turning over the radiation image to observe it from the front.

The image output from the radiation image reproducing apparatus stated above is generally recorded by a laser beam or the like on a photosensitive film sheet which is coated with a layer of photosensitive emulsion on one surface thereof. In this connection, difficulty heretofore experienced is that concerning an exposure from the rear of a patient, turning over such a film causes the other non-coated surface to face the person to often make the observation of the image uneasy, because the coated surface tends to reflect external light. Furthermore, it will be hard to read the object and exposure data recorded on the film when they are turned over together with the image.

The image processings already mentioned are performed within a processing system based on the input data related with an object and an exposure. In analyzing a reproduced image on a hard copy produced from the processing system, it is often required to know what kind of image processings the reproduced image underwent. Data on image processings will be readily attained if a diagnosis is made every time a hard copy is output from the processing system. However, in a totalized processing system which concentratively processes numerous stimulable phosphor sheets to produce numerous hard copies, it will be difficult in practice to properly match the data to the individual hard copies.

SUMMARY OF THE INVENTION

It is therefore an object of the present invention to provide a radiation image reproducing apparatus which is capable of producing hard copies of radiation images always in a condition suitable for visual analysis.

It is another object of the present invention to provide a radiation image reproducing apparatus which is capable of producing hard copies of reproduced images which facilitate matching of the reproduced images to image processings.

In one aspect of the present invention, there is provided a radiation image reproducing apparatus which reads a radiation image out of a first recording medium to record it on a second recording medium in a visible form. Data indicative of a direction of an exposure is entered into the apparatus in association with recording of the radiation image on the first recording medium. Referring to the direction data, the apparatus records the radiation image on the second recording medium with the radiation image inverted in the right-and-left direction if the direction data indicates that the radiation image is photographed in a direction opposite to a usual direction of object observation.

In another aspect of the present invention, there is provided a radiation image reproducing apparatus which may process a video signal indicative of a radiation image to record the processed radiation image on a recording medium in a visible form. While recording the radiation image on the recording medium, the apparatus records on the recording medium data associated with the image processings performed on the radiation image.

BRIEF DESCRIPTION OF THE DRAWINGS

The objects and features of the present invention will become more apparent from a consideration of the following detailed description and the drawings in which.

DESCRIPTION OF THE PREFERRED EMBODIMENTS

Figure 1:
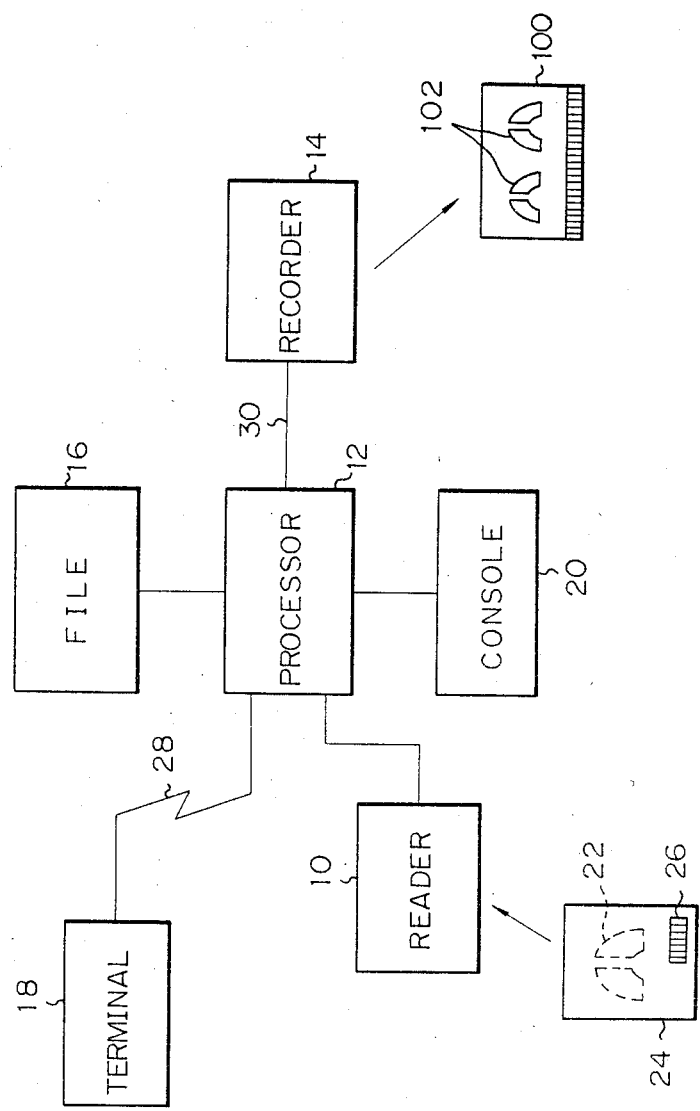
FIG. 1 is a schematic block diagram showing a radiation image reproducing apparatus in accordance with the present invention.

Referring to FIG. 1 of the drawings, a radiation image reproducing apparatus of the present invention is shown and basically comprises a reading unit 10, a processing unit 12, a recording unit 14, a file 16, a terminal unit 18 and a console 20. The image of an object is stored as a latent image 22 in an input recording medium 24, which includes a stimulable phosphor sheet, by a radiation which is transmitted through the object in an exposure room or cite. The reading unit 10 exposes the recording medium 24 to stimulating rays, photoelectrically reads the resulting light, and then enters the object's image into the apparatus in the form of video signals. Usually, the recording medium 24 is encased in a cassette and a label 26 bearing identification data particular to the medium 24 is adhered to part of the medium 24.

The terminal unit 18 serves as an input device for entering into the apparatus the identification data particular to the recording medium 24, identification data particular to an object (patient's name, sex etc.) and exposure data (exposed object's part, exposing method etc.). The terminal unit 18 is usually located in the vicinity of a radiation photographing device and connected to the processing unit 12 by a line 28, which may be a communication line or a bus. The console 20, although resembling the terminal unit 18, is located near the processing unit 12 and serves two different functions: a function of backing up the terminal unit 18 as an auxiliary input device for receiving data which are not entered through the terminal unit 18, and a system control function for entering various commands on the maintenance and operation of the apparatus.

The exposure conditions which may be entered through the terminal unit 18 include a direction of an exposure, from the front side or from the rear side of an object, which shows whether a desired image should or should not be inverted in the right-and-left direction when reproduced by the apparatus. This information is stored in the file 16 together with the identification data particular to the recording medium 24.

The terminal unit 18 may be constructed to read the data particular to the recording medium 24 either optically or magnetically in the event of exposure to a radiation. The information concerned with the exposing direction may be directly entered through the radiation photographing device without the manipulation of a keyboard mounted on the terminal unit 18.

The processing unit 12 is employed for processing various factors associated with images such as the gradation and spatial frequency, while effecting a total control over the entire apparatus as well. The file 16 is a mass storage typified by a floppy disc to store various data input through the terminal unit 18 and console 20 as well as image signals provided through the reading unit 10.

The recording unit 14 constitutes an image output device which subjects, for example, a laser beam to intensity modulation by image signals and other data signals output from the processor 12, so that the data may be recorded as visible data on an output recording medium 100 such as a photo film. The recording medium 100 may comprise a transparent film sheet to one side of which a photosensitive emulsion is applied.

The data entered through the terminal unit 18 or the console 20 is stored in the file 16. When the recording medium 24 is loaded in the reader 10, the medium identification data on the label 26 is sensed thereoutof either optically or magnetically to be used to obtain corresponding data out of the file 16. In the meantime, the video signal representing the object's radiation image read by the reader 10 is transferred by the processor 12 to the recorder 14 to thereby be recorded on the output recording medium 100 as a reproduced image of the object.

When the processor 12 reads out of the file 16 the data associated with the radiation image which is to be read by the reader 10, it identifies specific data included therein and indicative of an exposure direction so as to determine whether the radiation image was taken from the front or from the rear of the object.

Figure 3:
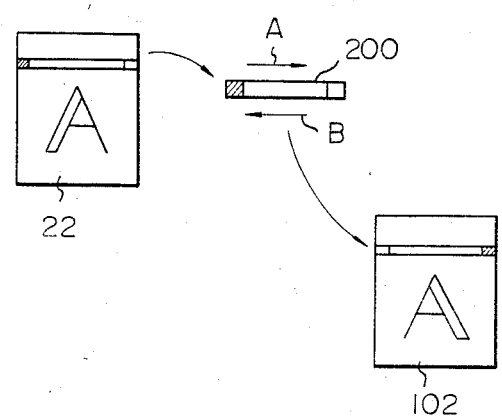
FIG. 3 is schematic diagram representing a procedure which a processing unit of FIG. 1 performs for inverting an image in the right-and-left direction.

The reader 10, scanning the radiation image 22 recorded on the recording medium 24 in a raster-scanning fashion, transfers the pixel signals to the processor 12. The processor 12 has a line buffer 200, FIG. 3, whose capacity is large enough to temporarily store at least one horizontal scan line of pixel signals. If the exposure is front one, the processor 12 reads the pixel signals out of the buffer 200 in the usual horizontal scan direction as when read the radiation image 22 out of the recording medium 24, i.e. direction indicated by an arrow A in FIG. 3. The pixel signals, developed from buffer 200 in the direction A, are fed from the processor 12 to the recorder 14 and file 16. If the exposure is a rear exposure, then the pixel signals will be read out of the buffer 200 in the other horizontal direction which is opposite to the direction of reading the radiation image 22, i.e. direction indicated by an arrow B in FIG. 3. Again, such pixel signals, developed from buffer 200 in the direction B, will be transferred to the recorder 14 and file 16. With this system, the image 102 produced from the recorder 14 will appear laterally non-inverted in the case of the front exposure, and inverted in the case of the rear exposure. The image signals, too, will be stored in the file 16 in the non-inverted state for a front exposure and in the inverted state for a rear exposure.

Alternatively, instead of the lateral inversion effected before storage into the file 16, the pixel signals read by the reader 10 may be fed to the file 16 without inversion. In such an alternative, pixel signals in the form of a rear exposure may laterally be inverted, after read out of the file 16, by means of buffer 200. Concerning the buffer 200, the lateral inversion may be effected either when pixel signals are read out of the buffer 200 or when they are written into the buffer 200.

Figure 2:
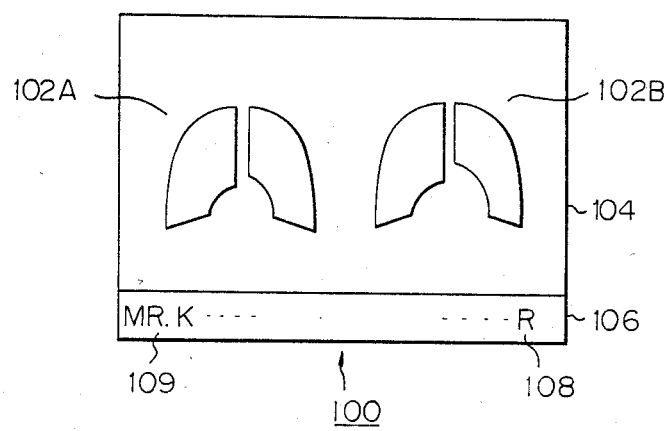
FIG. 2 is a plan view showing an example of a recording format on an output recording medium which is produced from a recording unit shown in FIG. 1.

Because the recorder 14 sequentially records data on the recording medium 100 in the usual scan direction, the image 102 on the recording medium 100 will appear laterally non-inverted for a front exposure and inverted for a rear exposure. An exemplary recording format designed for the recording medium 100 is shown in FIG. 2. The format has two discrete areas 104 and 106 which are respectively assigned to two-frame images 102A and 102B, and a visible display 109 of the previously mentioned input data and data related with image processings. It should be remembered that the number of frames shown and described is only illustrative and may be replaced by any other desired number. Where one 102B of the reproduced images on the medium 100 is the laterally inverted version, for example, the letter "R" 108 indicative of the lateral inversion is recorded in part of the data area 106 which is associated with the image 102B. It will be understood that the display of the letter "R" is not always necessary or, if desired, it may be substituted for by any other letter or character, or even by a mark such as "*".

Other data which may be recorded in the area 106 include the sex, name and other information particular to a patient, input data such as exposure conditions, and data concerned with image processings. Examples of such three different kinds of data are shown below.

object data: chart number, name, sex, date of birth, etc.
exposure conditions: name of hospital, radiographer's name, exposed object's part, exposing method, sensitivity, etc.

image processing conditions:
> gradation processing: type, gradient, center of rotation, density shift, etc.
> frequency processing: type of response, manner and degree of accentuation, etc.

others: date and time of exposure, bar code number of recording medium, etc.

Such data are represented by characters and marks which are legible to a doctor or like specialist during diagnoses. If desired, the recording medium 100 may additionally bear information which shows whether or not the medium 100 is the first hard copy produced after the reader 10 has read the recording medium.

While the present invention has been shown and described in conjunction with the reproduction of radiation images, such is not limitative but the principle of the present invention is effectively applicable to image processing systems which process images other than radiation images.

What is claimed is:

1. A radiation image reproducing apparatus comprising:
   reading means for sensing a radiation image stored in a first recording medium;
   processor means interconnected to said reading means for performing image processings on the radiation image sensed by said reading means;
   recording means interconnected to said processor means for recording the radiation image processed by said processor means on a second recording medium as a visible image; and
   input means interconnected to said processor means for receiving direction data indicative of a direction of an exposure in which direction the radiation image is recorded on the first recording medium;
   said processor means being operative in response to the direction data indicative of one direction, which is opposite to a usual direction of object observation, to record the radiation image on the second recording medium with the direction thereof inverted with respect to right and left.

2. An apparatus in accordance with claim 1, wherein said processor means comprises buffer means for temporarily storing the sensed radiation image, said buffer means being adapted to produce the stored radiation image in either of one and the other directions, said processor means controlling said buffer means to produce, in response to the direction data indicative of the one direction, the stored radiation image in such a direction as to invert the image in the right-and-left direction, and, otherwise, in the other direction opposite to the one direction.

3. An apparatus in accordance with claim 2, further comprising storage means interconnected to said processor means for temporarily storing the radiation image sensed by said reading means.

4. An apparatus in accordance with claim 3, wherein said processor means transfers the radiation image from said buffer means to said storage means, said radiation image being inverted in response to the direction data indicative of the one direction.

5. An apparatus in accordance with claim 3, wherein said processor means reads out the stored radiation image from said storage means into said buffer means, the readout radiation image being inverted in response to the direction data indicative of the one direction.

6. An apparatus in accordance with claim 1, wherein said recording means records the inverted radiation image together with the non-inverted image on the second recording medium.

7. An apparatus in accordance with claim 1, wherein said processor means controls said recording means to record as a visual indication on the second recording medium data associated with the image processings which are performed on the radiation image to be recorded on the second recording medium.

* * * * *